Dec. 5, 1933.    W. HERDLEIN    1,937,568
AIR CONDITIONING SYSTEM FOR RAILWAY CARS
Filed Dec. 21, 1932    2 Sheets-Sheet 1
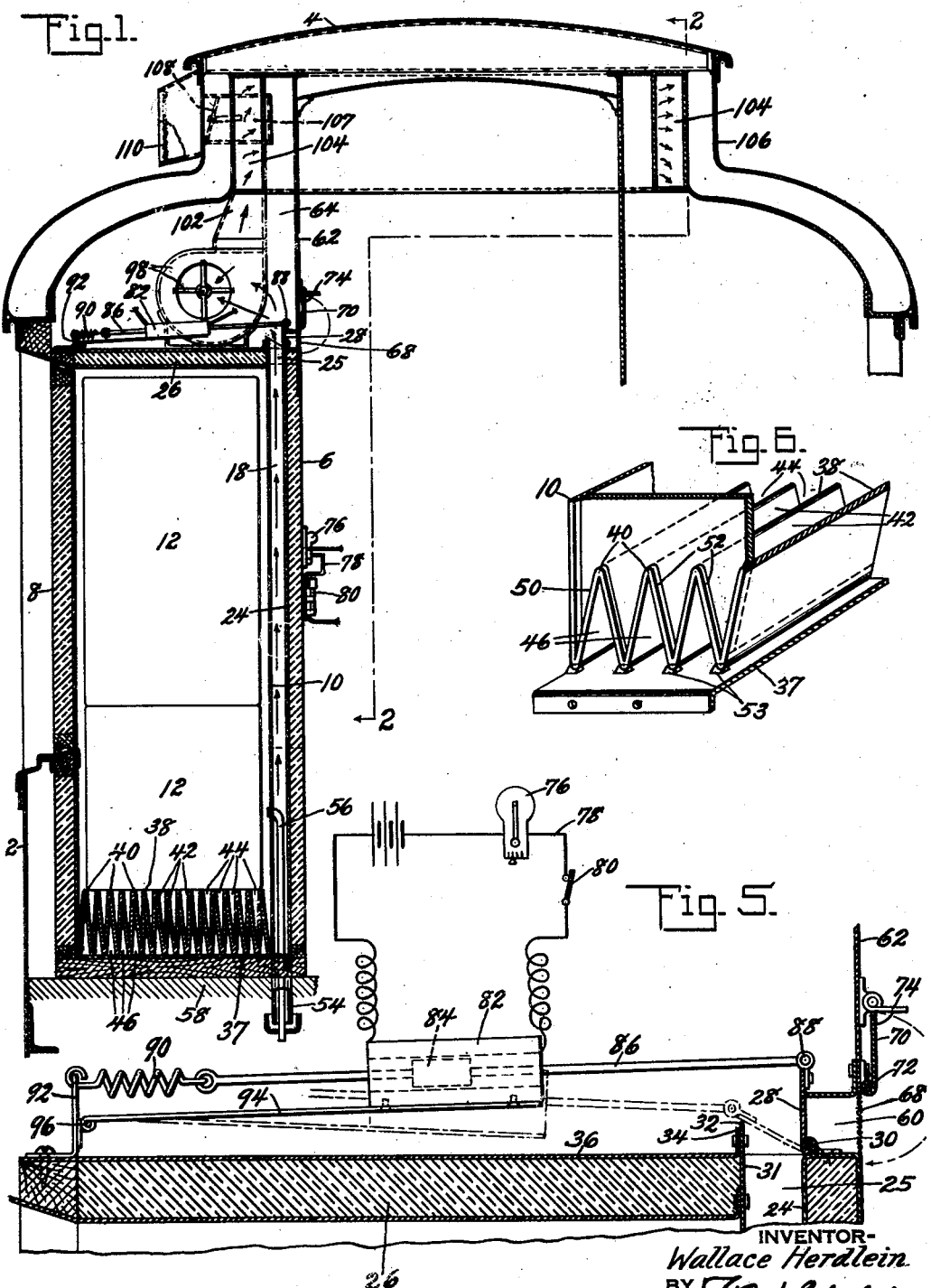
INVENTOR-
Wallace Herdlein.
BY
ATTORNEY- Dec. 5, 1933.                    W. HERDLEIN                    1,937,568
                    AIR CONDITIONING SYSTEM FOR RAILWAY CARS
                        Filed Dec. 21, 1932        2 Sheets-Sheet 2
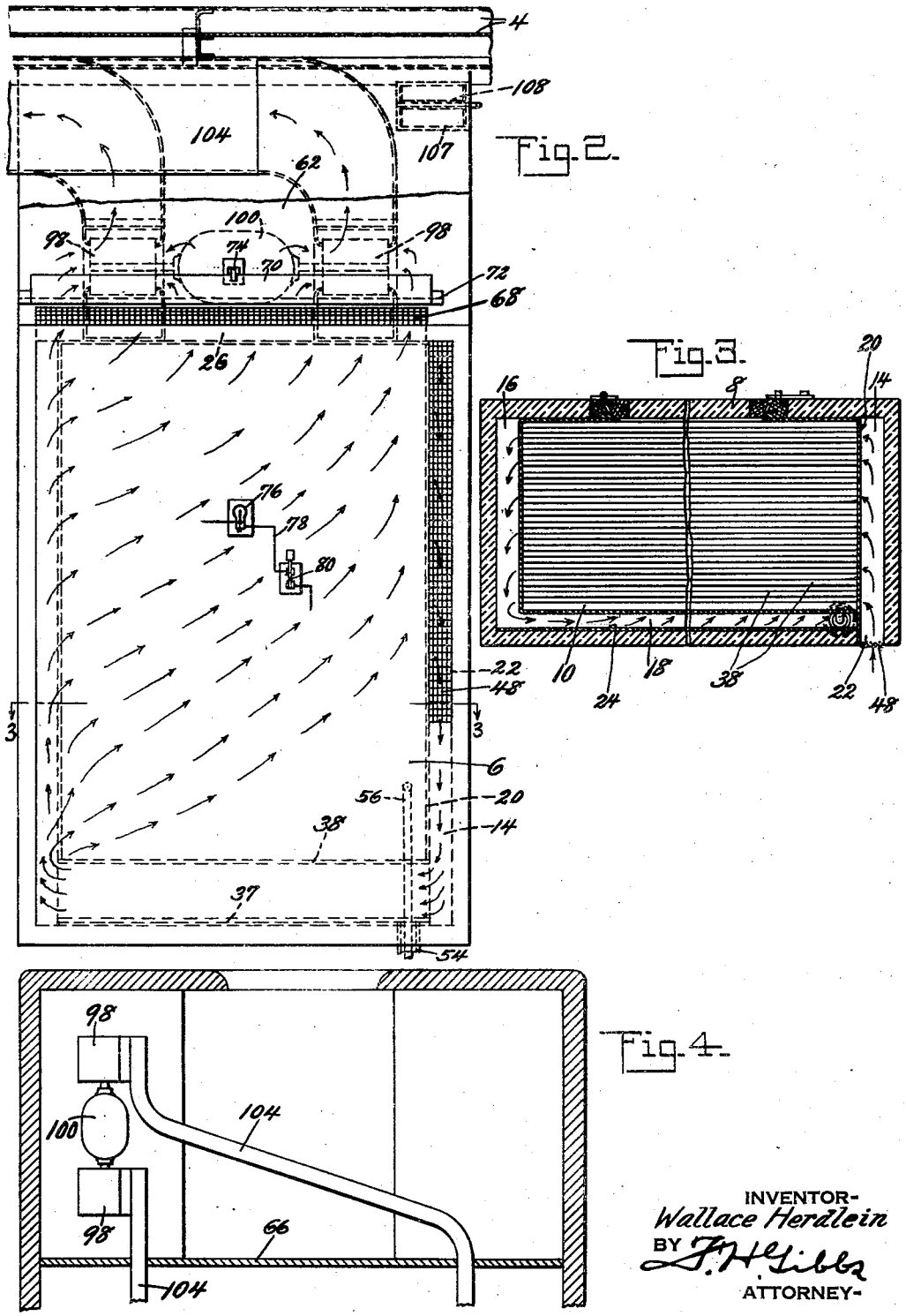
INVENTOR-
Wallace Herdlein
BY
                ATTORNEY- Patented Dec. 5, 1933

1,937,568

UNITED STATES PATENT OFFICE 1,937,568

AIR CONDITIONING SYSTEM FOR RAILWAY CARS

Wallace Herdlein, St. Louis, Mo., assignor to American Car and Foundry Company, New York, N. Y., a corporation of New Jersey Application December 21, 1932
Serial No. 648,195

9 Claims. (Cl. 62—24)

This invention relates to methods of and means for temperature conditioning the passenger compartments of vehicles such, for example, as railway cars.

One object of this invention is the provision of means for withdrawing air from the passenger compartment of a vehicle and circulating it through an air cooling or temperature conditioning unit and then injecting such cooled air into the passenger compartment of the vehicle.

Another object of this invention is the provision of a new and improved air conditioning unit for railway cars.

Still another object of this invention is the provision of an air conditioning unit for use with railway passenger cars which unit is provided with a novel design of grate for supporting a refrigerating medium.

A further object of this invention is the provision of a new and improved method for conditioning the air of a railway passenger car having provision for temperature conditioning a portion of the air from the passenger compartment and for injecting said conditioned air, together with air from outside the car, into the passenger compartment.

A still further object of this invention is the provision of an air conditioning unit for railway passenger cars having valve controlled means for regulating the condition of the air to be circulated or passed into the passenger compartment of the car.

This invention also contemplates a new and improved method for temperature conditioning the passenger compartment of a railway car.

The present invention also includes, in combination with a temperature conditioning unit for a railway passenger car, a new and improved valve operating device which is automatically controlled in response to temperature variations within the passenger compartment to regulate the condition of the air injected into the passenger compartment.

Other objects and advantages of this invention will be apparent from the following description taken in conjunction with the accompanying drawings in which:

Figure 1 is a sectional view through a portion of a railway car showing the apparatus of the present invention applied thereto.

Fig. 2 is a view on the line 2—2, Fig. 1.

Fig. 3 is a sectional view on the line 3—3, Fig. 2.

Fig. 4 is a more or less diagrammatic view showing the end portion of a railway car and the means for discharging air to the interior thereof.

Fig. 5 is an enlarged detail view showing the upper portion of the air conditioning compartment and the valve means together with the valve operating means; the view also showing, diagrammatically, an electric circuit for the control of the valve, and Fig. 6 is a fragmentary perspective view of the lower portion of the ice container, certain parts being shown in section and other parts being broken away.

Referring now more particularly to the drawings in which similar characters of reference designate similar parts in the several views, the car shown is of the conventional monitor deck type having side walls 2 and a roof indicated generally at 4. The air conditioning apparatus forming the subject matter of the present invention is arranged within the car body adjacent one end portion thereof (see Fig. 4) and comprises an air cooling compartment 6 formed of insulating material and provided with an opening in its rear wall which is closed by doors 8, the doors opening through the side wall 2, as clearly shown in Fig. 1. Arranged within the compartment 6 is a refrigerant holding container indicated generally at 10 which is adapted to receive water ice 12 or other suitable refrigerant. As clearly shown in Fig. 3, the container 10 is spaced from the side walls and front wall of the compartment 6 to provide an air entrance duct or passage 14, an air circulating passage 16 and an air discharge passage 18.

The side wall 20 of the ice container 10 extends to the front wall of the compartment 6 and a portion thereof projects into a longitudinal air entrance opening 22 formed in the front wall of the compartment (see Fig. 3); the wall 20 forming the end wall of the discharge passage 18. The discharge passage also includes a metal wall 24 secured to the inner surface of the front wall of the compartment 6, the wall 24 constituting a liner which extends upwardly through a discharge port 25 formed in the top wall 26 of the compartment 6, as clearly shown in Fig. 5. The upper end portion of the liner 24 is folded over the upper edge of the front wall of the compartment 6, as clearly shown in said Fig. 5 to form a stiffened support for a valve 28 hinged thereto as at 30, said valve being adapted to close the discharge port 25 when moved to the position illustrated in broken lines in Fig. 5 where it is seated against the upper edge portion 31 of the front wall of the ice container, the said wall extending through the port 25 and the portion 32 of said wall forming a valve seat which is braced by an upstanding flange 34 formed along a cover plate 36 secured to the top wall 26 of the compartment.

Arranged within the ice container 10 and supported on the bottom 37 thereof is an ice grate indicated generally at 38 comprising a plate so formed as to provide a plurality of integral adjacently arranged inverted V-shaped supporting portions 40 which obviously provide between the walls 42 thereof a plurality of upper receiving spaces constituting receptacles 44 and a plurality of lower spaces forming air ducts 46, the spaces 44 and 46 alternating and extending longitudinally of the container.

From the description thus far it will be apparent that air may pass through the opening 22 which is provided with a screen or filter 48 into the air inlet passage 14 and is then directed through the air conduits 46 into the air circulating passage 16 and discharge passage 18. To permit passage of air through the conduits 46 the lower portions of the side walls of the container 10 are provided with a plurality of adjacently arranged inverted V-shaped slots or apertures 50 which conform to the shape of the portions 40 of the grate 38 and, as shown in Fig. 6 the grate is so arranged that the portions 40 are positioned in the slots 50 and are welded as at 52 to the side walls of the container and said grate is also secured to the bottom 37 by suitable means such as by welding at 53.

In order to drain any water of condensation from the compartment 6, a drain pipe 54 is provided (see Fig. 1) and an overflow 56 is provided from the container 10, the drain 54 and overflow 56 both discharging from the car below the floor 58.

The valve 28, as before mentioned, is hinged as at 30 and said valve is adapted to close a port 60 formed in a partition 62 which extends from the roof 4 to the front wall of the compartment 6 and which forms the front wall of a blower chamber 64 arranged above the top wall 26 of the compartment 6. In practice, the partition 62 may extend to a transverse bulkhead 66 arranged in the car as shown clearly in Fig. 4. The port 60 is provided with a screen or filter 68 and said port may be fully closed by means of an externally arranged valve 70 hinged as at 72 so as to overlie the port 60 upon release of a latch 74 whereby air from the passenger compartment of the car is prevented from passing into the blower chamber 64.

The valve 28 is movable between the port 60 and the port 25 and as clearly shown in Fig. 5 the position of the valve is regulated or controlled in response to variations in temperature of the air within the passenger compartment. For this purpose a thermostat 76 is arranged within the passenger compartment of the car and is adapted to control an electric circuit 78 having a manually operaed switch 80 and a solenoid 82 provided with a core 84; said core being mounted on a valve rod 86 pivotally connected to the valve 28 as shown at 88 and having its opposite end connected by a tension spring 90 with a fixed bracket 92 secured to the top wall 26 of the compartment 6. The solenoid and its associated core are preferably supported by a bar 94 hinged to the bracket 92 as shown at 96. The spring 90 being a tension spring normally tends to retain the valve 28 in the broken line position shown in Fig. 5, in which position passage of air from the compartment 6 to the blower chamber 64 is prevented and air from the passenger compartment of the car may pass through port 60 into the blower chamber 64. Upon increase in temperature of the air beyond that determined by the setting of the thermostat 76, the circuit 78 is closed whereupon the solenoid 82 is energized to force the core 84 forwardly or to the right, as viewed in Fig. 5, to effect shifting of the valve to close the port 60, thereby opening the interior of the comparment 6 to the blower chamber through the port 25.

For effecting circulation of air in the car and temperature conditioning thereof, a pair of suction fans 98 are arranged in the blower chamber 64 and are operative by a motor 100 to draw air from the passenger compartment and pass said air through the blower housing 102 into ducts 104 arranged longitudinally of the car from where the air may be directed into the passenger compartment. While the cooled air may be forced into ducts arranged along the outside of the car the drawings herein disclose the ducts 104 as arranged adjacent the side decks 106 of the car. It will be apparent that the discharge of air from the blower chamber 64 into the car does not necessarily require the use of said ducts. For example, the air may be discharged through grills formed in the bulkhead 66. In the instance shown in the drawings the blowers 98 are each connected to one duct 104 but this, likewise, is by way of example as the two blowers 98 may direct air to a header arranged within the car body and provided with means for directing air at appropriate places in the passenger compartment.

Leading into the blower chamber 64 is a fresh air duct 107 adapted to convey outside air into the chamber 64 for circulation within the car. The duct 107 is provided with a damper 108 which may be manually controlled in any suitable or desired manner to regulate the amount of air admitted therethrough. Prior to passage into the duct 107 the outside air passes through a screen or suitable filter 110.

In use, the container 10 is charged with a suitable refrigerant such as water ice 12. The valve 28 normally closes the port 25 and with the damper 108 closing the fresh air duct, the fans 98 will draw air from the passenger compartment of the car into the blower chamber 64 through the port 68 and then into the passenger compartment through the blower housing 102 and the ducts 104. When the temperature of the air increases to the point at which the thermostat 76 is set, the electric circuit 78 closes and the solenoid is actuated to shift the valve 28 to the full line position shown in Fig. 5, thereby closing the port 60 and opening the port 25. When the valve 28 closes the port 60, operation of the fans 98 will draw air through the inlet opening 22 of compartment 6 into passage 14 within the compartment and then through the air ducts 46 of the ice grate, the air passing from said air ducts through passages 16 and 18 into surface contact with the walls of the ice container and then into the blower chamber 64 through the port 25. During its passage, the air contacts with the walls of the ice container and the walls of the air ducts. These walls are cool due to the ice in the container and it is apparent that a substantial part of the moisture in the air will be abstracted. The water of condensation which will collect on the walls serves to remove dust, dirt or other foreign matter from the air during its passage through compartment 6. The fans 98 force this cooled and dehumidified air through the housing 102 and the ducts 104 into the passenger compartment of the car.

Due to the particular formation and construction of the ice grate it is to be noted that the spaces 44 provide receptacles for water melting from the ice and this obviously provides large cooling surfaces which form the air ducts 46, thus aiding in quickly reducing the temperature of the air as it passes through the compartment 6.

The drawings show one specific embodiment of the invention but it is to be understood that they are for illustrative purposes only and various changes in the form and proportions of the construction may be made within the scope of the appended claims without departing from the spirit of the invention.

What is claimed is:

1. A temperature conditioning system for air within railway passenger cars comprising an air receiving compartment in communication with the passenger compartment of the car and provided with a refrigerant holding container therein, a grate for supporting a refrigerant arranged within the container and connected to opposite walls thereof in such a manner as to provide a plurality of adjacently arranged air ducts extending through opposite walls of the container and a plurality of refrigerant holding receptacles, said ducts and receptacles being respectively alternately arranged whereby to provide a plurality of individually cooled air cooling surfaces, and blower means operative to effect circulation of air from the passenger compartment through said ducts and into the passenger compartment.

2. In an air conditioning system for railway passenger cars, an air receiving compartment, a closed refrigerant holding container therein, means for circulating air from the passenger compartment of the car into surface contact with the refrigerant holding container, and a refrigerant supporting grate arranged within the container and connected to opposite walls thereof and formed with a plurality of air ducts extending through the said opposite walls of the container.

3. In an air conditioning system for railway passenger cars, an air receiving compartment, a refrigerant container in the compartment so arranged with relation thereto as to provide air passages therearound, a grate in said container formed to provide a plurality of air ducts extending through the container, a blower chamber in communication with the interior of the compartment, a duct leading from the passenger compartment of the car directly to the blower chamber, valve means operative to control passage of air from the air receiving compartment to the blower chamber and through said duct to said blower chamber and a solenoid operative in response to temperature conditions within the passenger compartment for actuating said valve.

4. In an air conditioning system for railway passenger cars, an air receiving compartment arranged within the car body, a refrigerant holding container within the compartment having said walls thereof spaced from the walls of the compartment to provide air ducts, the compartment having an air entrance opening from the passenger compartment of the car leading to one of said air ducts, a blower chamber above the compartment, a port leading from the compartment to the blower chamber and provided with a valve seat, a valve normally closing said port, an air entrance duct from the passenger compartment of the car directly to said blower chamber adapted to be closed by said valve, blower means for effecting circulation of air between the passenger compartment of the car and said blower chamber, a normally open electric circuit, a valve operator, a solenoid for actuating the valve operator connected in the electric circuit, and means operative in response to temperature conditions in the passenger compartment for closing the electric current whereby to energize said solenoid.

5. In an air conditioning system for railway passenger cars having an air receiving compartment and a refrigerant holding container therein, means for passing air to be cooled through said container out of direct contact with the refrigerant therein comprising an ice supporting grate arranged within the container and so formed as to provide a plurality of adjacently arranged inverted V-shaped portions defining upper water holding receptacles and lower air ducts, said receptacles and air ducts being respectively alternately arranged, and said grate extending between opposite walls of said container, said container having openings registering with the air ducts and said grate being connected to said walls adjacent said openings.

6. In an air conditioning system, an air receiving compartment having a closed refrigerant container therein, and a refrigerant supporting grate in the container extending between and secured to opposite walls thereof, said grate being so formed as to provide a plurality of adjacently arranged air ducts extending through opposite walls of the container and a plurality of refrigerant receptacles, said ducts and receptacles being alternately arranged.

7. In an air conditioning system for railway passenger cars an air receiving compartment having a closed refrigerant container therein, a refrigerant supporting grate extending between and secured to opposite walls of the container and so formed as to provide independent air ducts each extending through said opposite walls and refrigerant holding receptacles, said ducts and receptacles being alternately arranged, blower means for effecting circulation of air between said compartment and the passenger compartment of the car, and valve means operative in response to temperature conditions within the passenger compartment for controlling circulation of air through the air receiving compartment.

8. In an air conditioning system for railway passenger cars, an air receiving compartment, a blower chamber in communication therewith, a refrigerant holding container in the air receiving compartment having a refrigerant supporting grate extending between and connected to opposite walls of said container, said grate being so formed as to provide a plurality of alternating refrigerant holding receptacles and air ducts, the latter being connected to said opposite walls and extending individually therebetween, and valve means operative in response to temperature conditions within the passenger compartment for controlling the passage of air to the air receiving compartment and the blower chamber from the passenger compartment of the car.

9. In an air conditioning system for railway passenger cars, an air receiving compartment, a blower chamber in communication therewith, an air duct leading from the passenger compartment of the car directly to the blower chamber, air inlet means between the passenger compartment of the car and the air receiving compartment, a refrigerant holding container in the air receiving compartment having a refrigerant supporting grate extending between and secured to opposite walls of said container, said grate being so formed as to provide a plurality of alternating refrigerant holding receptacles and air ducts, the latter extending through said opposite walls, and valve means in the blower chamber operative in response to temperature conditions within the passenger compartment of the car for controlling passage of air from said passenger compartment through the air duct and air inlet means.

WALLACE HERDLEIN.